UNITED STATES PATENT OFFICE.

J. M. ALLEN, OF MARION, MASSACHUSETTS.

IMPROVEMENT IN THE MANUFACTURE OF PAPER.

Specification forming part of Letters Patent No. 49,209, dated August 8, 1865.

*To all whom it may concern:*

Be it known that I, JOHN M. ALLEN, of Marion, in the county of Plymouth and State of Massachusetts, have invented an Improved Manufacture of Paper; and I do hereby declare that the following is a description of my invention sufficient to enable those skilled in the art to practice it.

To the discovery of material from which various kinds of paper can be made to advantage much time and money have been applied, and the peculiar adaptation of many vegetable substances has been tested with more or less of successful result.

My invention is based on my discovery that the inner bark of trees of the genus *Pinus*, or the *Coniferæ*, has a long tough fiber permeated with gelatine, and perhaps other substances, which makes a natural "size" for the inner bark when macerated and triturated. I have also further discovered that if the inner bark is submitted to the action of steam when separated from the outer bark of newly-cut trees, the matter in said inner bark which causes change of color under the action of the atmosphere is either expelled or so changed in its nature that quite white or light-colored paper may be made from the bark without employment of bleaching agents. Great quantities of the trees indicated are yearly cut down for lumber and for the purpose of clearing up land. The bark of these trees, which is now wasted, can be utilized and prepared in the field for the paper-mill at little more than the mere cost of the labor involved, and from the fact that at certain seasons the bark separates easily from the woody matter and the inner from the outer layer of the bark the cost of labor would be comparatively small.

My invention, then, consists in a new article of manufacture or product, the same being paper produced from the inner layer of the bark of the *Coniferæ* when separated from the tree and the outer bark, and macerated and triturated, or otherwise equivalently reduced to a state of pulp.

From experiment I find the amount of natural size contained in the kind of inner bark referred to to be sufficient to render paper made therefrom, when of moderate thickness, translucent, which suggests the manufacture of artists' tracing-paper. For papers which are required of soft and pliable nature some of the natural size could be removed.

I prefer to employ the bark of the common pine tree, and, where required, to separate the inner layer of the bark into two qualities, the bark next the wood being finer than that part of the inner layer which joins the outer layer.

I claim—

The described new article of manufacture.

In witness whereof I have hereunto set my hand this 12th day of July, A. D. 1865.

JOHN M. ALLEN.

Witnesses:
   J. B. CROSBY,
   F. GOULD.